(12) United States Patent
Obata et al.

(10) Patent No.: US 8,013,091 B2
(45) Date of Patent: Sep. 6, 2011

(54) RESIN FOR OPTICAL COMPONENT, RAW MATERIAL COMPOSITION USED FOR RESIN FOR OPTICAL COMPONENT, AND OPTICAL COMPONENT

(75) Inventors: Yutaka Obata, Chiba (JP); Takeshi Iwasaki, Chiba (JP); Tomoaki Takebe, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 12/667,166

(22) PCT Filed: Jun. 30, 2008

(86) PCT No.: PCT/JP2008/061846
§ 371 (c)(1),
(2), (4) Date: Mar. 12, 2010

(87) PCT Pub. No.: WO2009/005036
PCT Pub. Date: Jan. 8, 2009

(65) Prior Publication Data
US 2010/0324246 A1    Dec. 23, 2010

(30) Foreign Application Priority Data
Jul. 2, 2007  (JP) .................. 2007-174496

(51) Int. Cl.
*C08F 222/14* (2006.01)
*C07C 69/753* (2006.01)
*C09K 19/00* (2006.01)

(52) U.S. Cl. .............. 526/282; 526/323.2; 524/553; 560/190; 560/220

(58) Field of Classification Search ............ 526/282, 526/323.2; 524/553; 560/190, 220
See application file for complete search history.

(56) References Cited

U.S. PATENT DOCUMENTS

| | | | |
|---|---|---|---|
| 2007/0224520 A1 | 9/2007 | Ogata et al. | |
| 2010/0022733 A1 | 1/2010 | Ota et al. | |

FOREIGN PATENT DOCUMENTS

| | | | |
|---|---|---|---|
| EP | 2 088 164 A1 | | 8/2009 |
| JP | 6 208001 | | 7/1994 |
| JP | 7 17713 | | 3/1995 |
| JP | 11 060655 | | 3/1999 |
| JP | 2002 105131 | | 4/2002 |
| JP | 2006 2073 | | 1/2006 |
| JP | 2006 213851 | | 8/2006 |
| JP | 2007-2144 | * | 1/2007 |
| JP | 2007 002144 | | 1/2007 |
| WO | WO 2008/062764 A1 | * | 5/2008 |

OTHER PUBLICATIONS

Machine Translation of JP 2007-2144; publication date: Jan. 11, 2007.*

* cited by examiner

*Primary Examiner* — Fred M Teskin
(74) *Attorney, Agent, or Firm* — Oblon, Spivak, McClelland, Maier & Neustadt, L.L.P.

(57) ABSTRACT

Provided are a resin for an optical component, which has heat resistance, does not suffer from yellowing because of its stability against heat, and is excellent in transparency and workability; a raw material composition used for the resin for an optical component; and an optical component. Specifically, provided is a resin for an optical component containing a (meth)acrylate compound unit (A1), in which a hydrocarbon group containing an adamantane structure is ester-bonded, and a (meth)acrylate compound unit (B1) having a polyfunctional group, which is other than the unit (A1). Also, provided is a raw material composition used for a resin for an optical component, which contains a (meth)acrylate compound (A2) in which a hydrocarbon group containing an adamantane structure is ester-bonded, and a (meth)acrylate compound (B2) having a polyfunctional group, which is other than the compound (A2). Further, provided is an optical component which is obtained by polymerizing and molding the raw material composition.

14 Claims, No Drawings

RESIN FOR OPTICAL COMPONENT, RAW MATERIAL COMPOSITION USED FOR RESIN FOR OPTICAL COMPONENT, AND OPTICAL COMPONENT

TECHNICAL FIELD

The present invention relates to a resin for an optical component, which has heat resistance, does not suffer from yellowing because of its stability against heat, and is excellent in transparency and workability, a raw material composition used for the resin for an optical component, and an optical component.

BACKGROUND ART

Heretofore, there are known as transparent resins, a polymethylmethacrylate resin, a polycarbonate resin, a polystyrene resin, an alicyclic olefin polymer (for example, see Patent Document 1), and an epoxy resin. Such transparent resins have been industrially manufactured in a large scale, and used in great quantities in various fields, because of their good transparency. Further, such transparent resins have been used as glass substitutes by taking advantages, in addition to their good transparency, of lightweight properties, cutting properties, and abradability. Further, while reflecting recent trends of lightness, thinness, shortness, and smallness, the resins tend to be used in many cases at a place which is more closer to heat sources than before. This requires the transparent resins to have higher heat resistance in addition to optical properties such as light transmittance. However, heat resistance of the above-mentioned transparent resins is not fully sufficient. For example, even the polycarbonate resin, which being said as having the highest heat resistance of the above transparent resins, has a glass transition temperature, which is an index of its heat resistance, of about 150° C. For this reason, there has been a need for the development of a new transparent resin having higher heat resistance.

Specifically, poly(meth)acrylate-based polymers such as polymethylmethacrylate, and polycarbonate-based polymers have already been used as a material of a resin for an optical component. Meanwhile, polymethylacrylate, which is one of the above poly(meth)acrylate-based polymers, is inferior in properties including heat resistance, thermal stability, chemical resistance, and solvent resistance, and has a high water absorption property and low water resistance. Therefore, polymethylacrylate was not able to be used in the field where such properties were demanded. In addition, polymethylmethacrylate is used as a material of a resin for an optical component as described above, but there was a problem that polymethylmethacrylate was not applicable to the field where heat resistance and thermal stability were especially demanded.

As a method of improving the above-mentioned, heretofore known problem involved in the poly(meth)acrylate-based polymers in the field of the material of a resin for an optical component, a method that employs a homopolymer of polycyclic alicyclic alkyl(meth)acrylate or a copolymer of the polycyclic alicyclic alkyl(meth)acrylate and various (meth) acrylate-based monomers is proposed (for example, see Patent Documents 2 and 3). Both of a homopolymer and a copolymer of the polycyclic alicyclic alkyl(meth)acrylate disclosed in Patent Documents 2 and 3 have been improved in their heat resistance and thermal stability as compared with the heretofore used polymethyl(meth)acrylate. However, the degree of improvement is small, and their practical properties are not sufficient. Consequently, the development of a polymer that is excellent in heat resistance and thermal stability has been strongly requested in the field of the material of a resin for an optical component.

[Patent Document 1] JP 2002-105131 A
[Patent Document 2] JP 07-17713 B
[Patent Document 3] JP 06-208001 A

DISCLOSURE OF THE INVENTION

Problem to be Solved by the Invention

The present invention has been made in view of the above circumstances, and an object of the present invention is to provide a resin for an optical component, which has heat resistance, does not suffer from yellowing because of its stability against heat, and is excellent in transparency and workability, a raw material composition used for the resin for an optical component, and an optical component.

Means for Solving the Problems

The inventors of the present invention have conducted intensive studies. As a result, the inventors have found that the above-mentioned object can be accomplished by using a resin for an optical component containing a specific (meth)acrylate compound unit. The present invention has been completed on the basis of such finding. Here, "(meth)acrylate" means both of acrylate and methacrylate. The same goes for other similar terms.

That is, the present invention provides a resin for an optical component, a raw material composition used for the resin for an optical component, and an optical component, all of which are described below:

1. a resin for an optical component, including: a (meth) acrylate compound unit (A1) in which a hydrocarbon group containing an adamantane structure is ester-bonded; and a (meth)acrylate compound unit (B1) having a polyfunctional group, which is other than the unit (A1);

2. the resin for an optical component according to the above item 1, including 1 to 80 mass % of the (meth)acrylate compound unit (B1);

3. the resin for an optical component according to the above item 1, in which at least one kind of the (meth)acrylate compound unit (B1) contains a soft segment moiety;

4. the resin for an optical component according to the above item 3, in which the content of the (meth)acrylate compound unit containing a soft segment moiety in the unit (B1) is 20 to 100 mass %;

5. the resin for an optical component according to the above item 1, further including one kind or more of (meth)acrylate compound unit (C1) which is other than the unit (B1), and is selected from a (meth)acrylate-modified silicone unit, a long-chain alkyl(meth)acrylate unit, and a polyalkylene glycol (meth)acrylate unit;

6. the resin for an optical component according to the above item 1, including 0.01 to 10 parts by mass of an antioxidant with respect to 100 parts by mass of the resin;

7. a raw material composition used for a resin for an optical component, including: a (meth)acrylate compound (A2) in which a hydrocarbon group containing an adamantane structure is ester-bonded; and a (meth)acrylate compound (B2) having a polyfunctional group, which is other than the compound (A2);

8. the raw material composition according to the above item 7, including 1 to 80 mass % of the (meth)acrylate compound (B2);

9. the raw material composition according to the above item 7, in which at least one kind of the (meth)acrylate compound (B2) contains a soft segment moiety;

10. the raw material composition according to the above item 9, in which the content of the (meth)acrylate compound containing a soft segment moiety in the component (B2) is 20 to 100 mass %;

11. the raw material composition according to the above item 7, further including one kind or more of (meth)acrylate compound (C2) which is other than the compound (B2), and is selected from (meth)acrylate-modified silicone oil, long-chain alkyl(meth)acrylate, and polyalkylene glycol (meth) acrylate;

12. the raw material composition according to the above item 7, including 0.01 to 10 parts by mass of an antioxidant with respect to 100 parts by mass of the raw material composition;

13. an optical component including the raw material composition according to the above item 7, the optical component being obtained by polymerizing and molding the raw material composition; and 14. an optical component including the raw material composition according to the above item 7, the optical component being obtained by polymerizing and molding the raw material composition using a liquid resin molding method.

Effects of the Invention

According to the present invention, there can be provided the resin for an optical component which has heat resistance, does not suffer from yellowing because of its stability against heat, and is excellent in transparency and workability, and an optical component.

BEST MODE FOR CARRYING OUT THE INVENTION

The resin for an optical component of the present invention includes a (meth)acrylate compound unit (A1) in which a hydrocarbon group containing an adamantane structure is ester-bonded, and a (meth)acrylate compound unit (B1) having a polyfunctional group, which is other than the unit (A1).

As the hydrocarbon group containing the adamantane structure of the unit (A1), there are exemplified hydrocarbon groups including a group selected from: an adamantyl group, a 1-methyladamantyl group, a 2-methyladamantyl group, a 1-ethyladamantyl group, a 2-ethyladamantyl group, a biadamantyl group, a dimethyladamantyl group, a diethyladamantyl group, 1-hydroxyadamantyl group, and 2-hydroxyadamantyl group. Of those, a 1-adamantyl group is particularly preferred.

As a (meth)acrylate compound forming a (meth)acrylate compound unit having a bifunctional group of the unit (A1), there can be exemplified adamantyl dimethanol di(meth) acrylate and adamantyl diethanol di(meth)acrylate. Further, as a (meth)acrylate compound forming a (meth)acrylate) acrylate compound unit having a trifunctional group of the unit (A1), there can be exemplified adamantyl trimethanol tri(meth)acrylate and adamantyl triethanol tri(meth)acrylate.

One kind or a combination of two or more kinds of the (meth)acrylate compound unit may be used as the unit (A1).

The (meth)acrylate compound unit having a polyfunctional group as the unit (B1) is a compound unit other than the (meth)acrylate compound unit as the above unit (A1).

As a (meth)acrylate compound forming the (meth)acrylate compound unit having a bifunctional group of the unit (B1), there are exemplified diethyleneglycol di(meth)acrylate, triethyleneglycol di(meth)acrylate, tetraethyleneglycol di(meth)acrylate, propyleneglycol di(meth)acrylate, dipropyleneglycol di(meth)acrylate, tripropyleneglycol di(meth) acrylate, 1,3-butylenediol di(meth)acrylate, 1,4-butanediol di(meth)acrylate, 1,6-hexanediol di(meth)acrylate, 1,9-nonanediol di(meth)acrylate, neopentylglycol di(meth)acrylate, cyclohexanedimethanol di(meth)acrylate, tricyclodecanedimethanol di(meth)acrylate, and further, polyethyleneglycol di(meth)acrylate, polypropyleneglycol di(meth)acrylate, alkoxylated hexanediol di(meth)acrylate, alkoxylated cyclohexanedimethanol di(meth)acrylate, alkoxylated bisphenol A di(meth)acrylate, polybutadiene di(meth)acrylate, hydrogenated polybutadiene di(meth)acrylate, and di(meth)acrylate compounds in which an alicyclic hydrocarbon group is ester-bonded. Examples of the alicyclic hydrocarbon group include a cyclohexyl group, a 2-decahydronaphthyl group, a norbornyl group, a 1-methyl-norbornyl group, a 5,6-dimethyl-norbornyl group, an isobornyl group, a tetracyclo[4.4.0.1$^{2,5}$.1$^{7,10}$]dodecyl group, a 9-methyl-tetracyclo[4.4.0.1$^{2,5}$.1$^{7,10}$]dodecyl group, a bornyl group, and a dicyclopentanyl group.

As a (meth)acrylate compound forming the (meth)acrylate compound unit having a trifunctional group or more of the unit (B1), there are exemplified trimethylolpropane tri(meth) acrylate, ethoxylated trimethylolpropane tri(meth)acrylate, propoxylated trimethylolpropane tri(meth)acrylate, alkoxylated trimethylolpropane tri(meth)acrylate, ethoxylated glyceryl tri(meth)acrylate, propoxylated glyceryl tri(meth)acrylate, alkoxylated glyceryl tri(meth)acrylate, ethoxylated pentaerythritol tetra(meth)acrylate, propoxylated pentaerythritol tetra(meth)acrylate, alkoxylated pentaerythritol tetra(meth)acrylate, ditrimethylolpropane tetra(meth)acrylate, ethoxylated dipentaerythritol hexa(meth)acrylate, propoxylated dipentaerythritol hexa(meth)acrylate, alkoxylated dipentaerythritol hexa(meth)acrylate, ethoxylated dipentaerythritol penta(meth)acrylate, propoxylated dipentaerythritol penta(meth)acrylate, alkoxylated dipentaerythritol penta (meth)acrylate, and polyfunctional polyester (meth)acrylate.

One kind or a combination of two or more kinds of the (meth)acrylate compound unit may be used as the unit (B1).

As the (meth)acrylate compound unit as the unit (B1), preferred is one (meth)acrylate compound unit formed of at least one kind of (meth)acrylate compound unit containing a soft segment moiety. The "compound unit containing a soft segment moiety" means a compound unit which has a soft segment in its skeleton. As the soft segment moiety, there are exemplified an ethoxy moiety, a propoxy moiety, an ethylene glycol moiety, a propylene glycol moiety, a butylene glycol moiety, a butanediol moiety, a hexanediol moiety, and a neopentyl glycol moiety, which are moieties having high flexibility.

The content of the (meth)acrylate compound unit containing a soft segment moiety in the unit (B1) is preferably 20 to 100 mass %, more preferably 23 to 100 mass %, still more preferably 25 to 100 mass %. If the content of the (meth) acrylate compound unit containing a soft segment moiety is 20 mass % or more, good heat resistance of the resin is realized, so crack generation is suppressed.

In addition, the content of the (meth)acrylate compound unit (B1) having a polyfunctional group in the resin for an optical component is preferably 1 to 80 mass %, more preferably 5 to 75 mass %, still more preferably 10 to 70 mass %. If the content of the unit (B1) is 1 mass % or more, the addition effect of the resin is achieved. If the content is 80 mass % or less, shape stability of the resin upon heating is good, and good thermal yellowing resistance is also realized.

The resin for an optical component of the present invention may further include, as a unit (C1), one kind or more of (meth)acrylate compound unit other than the (B1) unit selected from, a (meth)acrylate-modified silicone unit, a long-chain alkyl(meth)acrylate unit, and a polyalkyleneglycol (meth)acrylate unit. The (meth)acrylate-modified silicone unit of the unit (C1) is formed of (meth)acrylate-modified silicone oil. The (meth)acrylate-modified silicone oil is a compound having an acrylic group and/or a methacrylic group in its terminal, and containing a dialkylpolysiloxane in its skeleton.

The (meth)acrylate-modified silicone oil can be mainly obtained from a modified product of dimethylpolysiloxane. In addition, all or one part of an alkyl group in the skeleton of the dialkylpolysiloxane may be substituted by a phenyl group and an alkyl group other than a methyl group instead of the methyl group of dimethylpolysiloxane. Examples of the alkyl group other than a methyl group include an ethyl group and a propyl group. Specific examples of the (meth)acrylate-modified silicone oil include X-24-8201, X-22-174DX, X-22-2426, X-22-2404, X-22-164A, and X-22-164C manufactured by Shin-Etsu Chemical Co., Ltd. and BY16-152D, BY16-152, and BY16-152C manufactured by Dow Corning Toray Co., Ltd.

In addition, as the (meth)acrylate-modified silicone oil, there may be used a polydialkylsiloxane having an acryloxyalkyl terminal or a methacryloxyalkyl terminal. Specific examples thereof include methacryloxypropyl terminated polydimethylsiloxane, (3-acryloxy-2-hydroxypropyl) terminated polydimethylsiloxane, acryloxy terminated ethylene oxide dimethylsiloxane-ethylene oxide ABA block copolymer, and methacryloxypropyl terminated branched polydimethylsiloxane.

Of those (meth)acrylate-modified silicone oils, in terms of transparency of the obtained polymerized resin, (3-acryloxy-2-hydroxypropyl) terminated polydimethylsiloxane and acryloxy terminated ethylene oxide dimethylsiloxane-ethylene oxide ABA block copolymer are preferred.

As the long-chain alkyl(meth)acrylate of the unit (C1) other than the above unit (B1), there are exemplified a (meth)acryl compound having a hydrogenated polyisoprene skeleton such as hydrogenated polyisoprene di(meth)acrylate, and a (meth)acrylate compound having an alkyl group having 12 or more carbon atoms such as stearyl methacrylate. Examples of the alkyl group having 12 or more carbon atoms include a dodecyl group, a tetradecyl group, a hexadecyl group, an octadecyl group (including a stearyl group), an icosyl group, a triacontyl group, and a tetracontyl group. By using a compound having an alkyl group having 12 or more carbon atoms, excellent adhesiveness is obtained. Of those long-chain alkyl(meth)acrylates, stearyl methacrylate is preferred in terms of flexibility of the resin.

The resin for an optical component of the present invention may contain an antioxidant if necessary. As the antioxidant, there are exemplified a phenol-based antioxidant, a phosphorus-based antioxidant, a sulphur-based antioxidant, a vitamin-based antioxidant, a lactone-based antioxidant, and an amine-based antioxidant.

Examples of the phenol-based antioxidants include commercially available products such as Irganox 1010 (trademark, manufactured by Ciba Specialty Chemicals Inc.), Irganox 1076 (trademark, manufactured by Ciba Specialty Chemicals Inc.), Irganox 1330 (trademark, manufactured by Ciba Specialty Chemicals Inc.), Irganox 3114 (trademark, manufactured by Ciba Specialty Chemicals Inc.), Irganox 3125 (trademark, manufactured by Ciba Specialty Chemicals Inc.), BHT (trademark, manufactured by Takeda Pharmaceutical Co., Ltd.), Cyanox 1790 (trademark, manufactured by American Cyanamid Company), and Sumilizer GA-80 (trademark, manufactured by Sumitomo Chemical Co. Ltd.).

Examples of the phosphorus-based antioxidants include commercially available products such as Irgafos 168 (trademark, manufactured by Ciba Specialty Chemicals Inc.), Irgafos 12 (trademark, manufactured by Ciba Specialty Chemicals Inc.), Irgafos (trademark, manufactured by Ciba Specialty Chemicals Inc.), ADKSTAB 329K (trademark, manufactured by ADEKA CORPORATION), ADKSTAB PEP36 (trademark, manufactured by ADEKA CORPORATION), ADKSTAB PEP-8 (trademark, manufactured by ADEKA CORPORATION), Irgafos P-EPQ (trademark, manufactured by Clariant Japan K.K.), Weston 618 (trademark, manufactured by GE Specialty Chemicals, Inc.), Weston 619G (trademark, manufactured by GE Specialty Chemicals, Inc.), and Weston 624 (trademark, manufactured by GE Specialty Chemicals, Inc.).

Examples of the sulfur-based antioxidants include commercially available products such as DSTP "Yoshitomi" (trademark, manufactured by API Corporation), DLTP "Yoshitomi" (trademark, manufactured by API Corporation), DLTOIB "Yoshitomi" (trademark, manufactured by API Corporation), DMTP "Yoshitomi" (trademark, manufactured by API Corporation), Seenox 412S (trademark, manufactured by SHIPRO KASEI KAISHA, LTD.), and Cyanox 1212 (trademark, manufactured by American Cyanamid Company).

Examples of the vitamin-based antioxidants include commercially available products such as tocopherol (manufactured by Eisai Co., Ltd.) and Irganox E201 (trademark, manufactured by Ciba Specialty Chemicals Inc., compound name: 2,5,7,8-tetramethyl-2(4',8',12'-trimethyltridecyl)coumarone-6-01).

Lactone-based antioxidants that may be used are those disclosed in JP 07-233160 A and JP 07-247278 A. Another example of the lactone-based antioxidants includes a commercially available product such as HP-136 (trademark, manufactured by Ciba Specialty Chemicals Inc., compound name: 5,7-di-t-butyl-3-(3,4-dimethylphenyl)3H-benzofuran-2-one).

Examples of the amine-based antioxidants include commercially available products such as Irgastab FS042 (trademark, manufactured by Ciba Specialty Chemicals Inc.) and GENOX EP (trademark, manufactured by Crompton Corporation, compound name: dialkyl-N-methylamine oxide).

One kind of antioxidant may be used alone, or two or more kinds thereof may be used in combination.

The content of the antioxidant is generally about 0.01 to 10 parts by mass, preferably 0.01 to 5 parts by mass, more preferably 0.02 to 2 parts by mass with respect to 100 parts by mass of the resin for an optical component. If the content of the antioxidant is 10 parts by mass or less, deterioration in transparency of the resin material for optical component can be reduced.

A raw material composition used for the resin for an optical component (which may hereinafter be referred to as "raw material composition") of the present invention includes a (meth)acrylate compound (A2) in which a hydrocarbon group containing an adamantane structure is ester-bonded and a (meth)acrylate compound (B2) having a polyfunctional group, which is other than the above component (A2). Specific examples and the like of the component (A2) and component (B2) are as described for the above-mentioned unit (A1) and unit (B1).

The raw material composition of the present invention may further include, as a component (C2), one or more kinds of (meth)acrylate compounds selected from (meth)acrylate-modified silicone oil, long-chain alkyl(meth)acrylate, and polyalkylene glycol (meth)acrylate. Specific examples and the like of the component (C2) are as described for the above-mentioned unit (C1).

The raw material composition of the present invention may be blended with a radical polymerization initiator if necessary. Examples of the radical polymerization initiator include ketone peroxides such as methyl ethyl ketone peroxide, methyl isobutyl ketone peroxide, acetylacetone peroxide, cyclohexanone peroxide, and methylcyclohexanone peroxide; hydroperoxides such as 1,1,3,3-tetramethylbutylhydroperoxide, cumene hydroperoxide, and t-butyl hydroperoxide; diacyl peroxides such as diisobutyryl peroxide, bis(3,5,5-trimethylhexanol) peroxide, lauroyl peroxide, benzoyl peroxide, and m-toluoyl benzoyl peroxide; dialkyl peroxides such as dicumyl peroxide, 2,5-dimethyl-2,5-di(t-butylperoxy)hexane, 1,3-bis(t-butylperoxyisopropyl)hexane, t-butyl cumyl peroxide, di-t-butyl peroxide, and 2,5-dimethyl-2,5-di(t-butylperoxy)hexene; peroxyketals such as 1,1-di(t-butylperoxy-3,5,5-trimethyl)cyclohexane, 1,1-di-t-butylperoxycyclohexane, and 2,2-di(t-butylperoxy)butane; alkylperesters such as 1,1,3,3-tetramethylbutylperoxyneodicarbonate, α-cumylperoxyneodicarbonate, t-butylperoxyneodicarbonate, t-hexyl peroxypivalate, t-butyl peroxypivalate, 1,1,3,3-tetramethylbutyl peroxy-2-ethylhexanoate, t-amyl peroxy-2-ethylhexanoate, t-butylperoxy-2-ethylhexanoate, t-butyl peroxyisobutyrate, di-t-butyl peroxyhexahydroterephthalate, 1,1,3,3-tetramethylbutyl peroxy-3,5,5-trimethylhexanoate, t-amyl peroxy-3,5,5-trimethylhexanoate, t-amyl peroxy-3,5,5-trimethylhexanoate, t-butyl peroxyacetate, t-butyl peroxybenzoate, and dibutyl peroxytrimethyladipate; peroxycarbonates such as di-3-methoxybutyl peroxydicarbonate, di-2-ethylhexyl peroxydicarbonate, bis(1,1-butylcyclohexaoxy dicarbonate), diisopropyloxy dicarbonate, t-amylperoxy isopropyl carbonate, t-butylperoxy isopropyl carbonate, t-butylperoxy 2-ethylhexyl carbonate, and 1,6-bis(t-butylperoxycarboxy)hexane; and 1,1-bis(t-hexylperoxy)cyclohexane and (4-t-butylcyclohexyl)peroxycarbonate.

In general, those radical polymerization initiators are cleaved by heat to thereby generate initiator radicals. Other than those radical polymerization initiators, radical polymerization initiators which generate initiator radicals with light, electron beam, or radiation may also be used. Examples of such radical polymerization initiators include a benzoin ether, 2,2-dimethoxy-1,2-diphenylethane-1-one (trademark: IRGACURE 651, manufactured by Ciba Specialty Chemicals Inc.), 1-hydroxy-cyclohexyl-phenyl ketone (trademark: IRGACURE 184, manufactured by Ciba Specialty Chemicals Inc.), 2-hydroxy-2-methyl-1-phenyl-propane-1-one (trademark: DAROCUR 1173, manufactured by Ciba Specialty Chemicals Inc.), 1-[4-(2-hydroxyethoxy)-phenyl]-2-hydroxy-2-methyl-1-propane-1-one (trademark: IRGACURE 2959, manufactured by Ciba Specialty Chemicals Inc.), 2-hydroxy-1-[4-[4-(2-hydroxy-2-methyl-propionyl)-benzyl]phenyl]1-2-methyl-propane-1-one (trademark: IRGACURE 127, manufactured by Ciba Specialty Chemicals Inc.), 2-methyl-1-(4-methylthiophenyl)-2-morphorinopropane-1-one (trademark: IRGACURE 907, manufactured by Ciba Specialty Chemicals Inc.), 2-benzyl-2-dimethylamino-1-(4-morphorinophenyl)-butanone-1 (trademark: IRGACURE 369, manufactured by Ciba Specialty Chemicals Inc.), 2-(dimethylamino)-2-[(4-methylphenyl)methyl]-1-[4-(4-monophorlnyl)phenyl]-1-butanone (trademark: IRGACURE 379, manufactured by Ciba Specialty Chemicals Inc.), 2,4,6-trimethylbenzoyl-diphenyl-phosphineoxide (trademark: DAROCUR TPO, manufactured by Ciba Specialty Chemicals Inc.), bis(2,4,6-trimethylbenzoyl)-phenylphosphineoxide (IRGACURE 819, manufactured by Ciba Specialty Chemicals Inc., trademark), bis(η5-2,4-cyclopentadiene-1-yl)-bis(2,6-difluoro-3-(1H-pyrrol e-1-yl)-phenyl) titanium (IRGACURE 784, manufactured by Ciba Specialty Chemicals Inc., trademark), 1,2-octanedione, 1-[4-(phenylthio)-, 2-(O-benzoyloxime)] (IRGACURE OXE 01, manufactured by Ciba Specialty Chemicals Inc., trademark), ethanone, 1-[9[ethyl-6-(2-methylbenzoyl)-9H-carbazole-3-yl]-, 1-(O-acetyloxime) (IRGACURE OXE 02, manufactured by Ciba Specialty Chemicals Inc., trademark).

One kind of radical polymerization initiator may be used alone, or two or more kinds thereof may be used in combination.

The usage of the radical polymerization initiator is generally about 0.01 to 10 parts by mass, preferably 0.05 to 5 parts by mass with respect to 100 parts by mass of the total amount of the component (A2) and the component (B2), or the total amount of the component (A2), the component (B2), and the component (C2). In the case where the polymerization is initiated by heat, a raw material composition containing the radical polymerization initiator may generally be polymerized by heating to about 40 to 200° C. In the case where the polymerization is initiated by light, the raw material composition may be polymerized by being irradiated with ultraviolet light or visible light using, for example, a Mercury Xenon lamp as a light source.

The raw material composition of the present invention may be blended with, in addition to the above-mentioned antioxidants, a light stabilizer, an ultraviolet absorber, a glidant such as a higher dicarboxylic acid metal salt and a higher carboxylic acid ester, a plasticizer, an inorganic filler, a coloring agent, an antistatic agent, a lubricant, a mold release agent, and a flame retardant if necessary.

A known light stabilizer may be used as the light stabilizer, and preferred is a hindered amine-based light stabilizer. Specific examples of the hindered amine-based light stabilizer include ADKSTAB LA-77, ADKSTAB LA-57, ADKSTAB LA-52, ADKSTAB LA-62, ADKSTAB LA-67, ADKSTAB LA-68, ADKSTAB LA-63, ADKSTAB LA-94, ADKSTAB LA-82, and ADKSTAB LA-87 (all of which are manufactured by ADEKA CORPORATION); Tinuvin 123, Tinuvin 144, Tinuvin 440, Tinuvin 662, Chimassorb 2020, Chimassorb 119, Chimassorb 944 (all of which are manufactured by Ciba Specialty Chemicals Inc.), Hostavin N30 (manufactured by Hoechst GmbH), Cyasorb UV-3346, Cyasorb UV-3526 (both of which are manufactured by Cytec Industries Inc.), Uval 299 (GLC), and Sanduvor PR-31 (Clariant). One kind of light stabilizer may be used alone, or two or more kinds thereof may be used in combination.

The usage of the light stabilizer is generally about 0.005 to 5 parts by mass, preferably 0.02 to 2 parts by mass with respect to 100 parts by mass of the total amount of the component (A2) and the component (B2), or the total amount of the component (A2), the component (B2), and the component (C2).

The optical component of the present invention can be produced by polymerizing and molding the above raw material composition. Upon polymerization of the raw material composition, prepolymerization may be performed by adding the above radical polymerization initiator to a monomer component containing component (A2) as the main component. The viscosity of the raw material composition can be controlled by performing such prepolymerization. As the method for polymerizing and molding, the same method as in molding of thermosetting resins may be employed. The method is, for example, a method involving polymerizing and molding the above raw material composition or a prepolymerized material thereof by liquid resin injection molding, compression molding, transfer molding, insert molding, or the like. In addition, molded products can be obtained by potting or coating. Further, the molded products can be also obtained by the same method as in molding of light curable resins, for example, UV cure molding.

The optical component of the present invention is preferably produced by a liquid resin molding method. Examples of the liquid resin molding method include: liquid resin injection molding which involves loading under pressure a liquid raw material composition or a liquid prepolymerized material thereof at ordinary temperature into a hot mold, and thermally curing the resultant; compression molding which involves charging a raw liquid material composition into a mold and pressing to cure the resultant; and transfer molding which involves loading under pressure a liquid raw material composition that has been warmed into a mold to cure the resultant.

EXAMPLES

Hereinafter, the present invention is described more specifically by way of examples. However, the present invention is by no means limited to those examples. It should be noted that cured products obtained in each example were evaluated by the following method. In addition, the cured products in each example were obtained by the following molding method A, molding method B, or molding method C.

(1) Presence or Absence of Crack after Heat History

Three plate-like bodies each of which was 2 mm thick, 25 mm long, and 25 mm wide were used. Those plate-like bodies were placed on a 3 mm-thick stainless steel plate, and left to stand for 10 minutes at 250° C. After that, the presence or absence of cracks in the plate-like bodies was checked, and the results were evaluated by the following criteria.

○: No cracks occurred.
  Δ: Cracks each of which was equal to or more than 10 mm long occurred in two or less of the plate-like bodies, or all the cracks occurred were less than 10 mm long.
  x: Cracks each of which was equal to or more than 10 mm long occurred in all of the three plate-like bodies.

(2) Shape Stability Evaluation after Heat History

Three plate-like bodies each of which was 2 mm thick, 25 mm long, and 25 mm wide were used. Those plate-like bodies were placed on a 3 mm-thick stainless steel plate, and left to stand for 10 minutes at 250° C. After that, the degree of deformation of the marginal parts of the plate-like bodies was visually observed, and the results were evaluated by the following criteria.

○: The marginal parts remained the same as before the heat history, and thus, the plate-like bodies were considered to be excellent in shape stability.
  Δ: The marginal parts were partially rounded, and thus, the shape stability of the plate-like bodies was considered to be normal.
  x: The marginal parts were uniformly rounded, and thus, the plate-like bodies were considered to be inferior in shape stability.

(3) Light Transmittance

The light transmittance (unit: %) was measured in accordance with JIS K7105 using test pieces each having a thickness of 3 mm. HGM-2DP (manufactured by Suga Test Instruments Co., Ltd.) was used as the measuring device. The measurement was carried out for: a test piece before placing in oven; a test piece after placing in oven at a temperature of 250° C. for 10 minutes; and a test piece after placing in oven at a temperature of 140° C. for 100 hours. They are described as "initial properties", "heat resistance test 1", and "heat resistance test 2", respectively. The same goes for the YI value discussed below. The absolute value of the difference between total light transmittances of the test piece before placing in oven and the test piece after placing in oven at a temperature of 250° C. for 10 minutes is described as "Δ250 total light transmittance" (unit: %). In addition, the absolute value of the difference between total light transmittances of the test piece before placing in oven and the test piece after placing in oven at a temperature of 140° C. for 100 hours is described as "0140 total light transmittance" (unit: %).

(4) YI Value

Test pieces each of which was 30 mm long, 30 mm wide, and 3 mm thick were used. An SZ optical SENSOR (manufactured by Nippon Denshoku Industries Co., Ltd.) was used as the measuring device for YI value. The absolute value of the difference between YI values of the test piece before placing in oven and the test piece after placing in oven at a temperature of 250° C. for 10 minutes is described as "Δ250 YI". In addition, the absolute value of the difference between YI values of the test piece before placing in oven and the test piece after placing in oven at a temperature of 140° C. for 100 hours is described as "Δ140 YI".

(5) Molding Method

<Molding Method A>

A raw material composition was poured into a cell which had been prepared by putting a 3 mm-thick TEFLON (registered trademark) spacer between two glass plates, and heated in oven at 110° C. for 3 hours, followed by at 160° C. for 1 hour to polymerize and mold the composition. After that, the resultant was cooled to room temperature, to thereby obtain a clear and colorless plate-like body.

<Molding Method B>

A raw material composition was poured into a cell which had been prepared by putting a 3 mm-thick TEFLON (registered trademark) spacer between two glass plates, and heated in oven at 100° C. for 3 hours, followed by at 160° C. for 1 hour to polymerize and mold the composition. After that, the resultant was cooled to room temperature, to thereby obtain a clear and colorless plate-like body.

<Molding Method C>

A raw material composition was polymerized and molded using a liquid resin sealing device (LM-1, manufactured by Takara Tool & Die Co. Ltd.), to thereby obtain a plate-like cured product. The condition for polymerizing and molding was as follows: mold temperature of 130° C. and curing time of 3 minutes. The obtained cured product was heated at 160° C. for 1 hour, and cooled slowly at room temperature, to thereby obtain a clear and colorless plate-like body.

Table 1 and Table 2 show the total amount of curing time in each molding method. The shorter the curing time, the better the productivity because of the short molding cycle. Therefore, it is preferred that the curing time be short.

Example 1

To 50 g of 1-adamantyl methacrylate (manufactured by Osaka Organic Chemical Industry Ltd.) as the component (A2), and 20 g of dipentaerythritol pentaacrylate (SR-399, manufactured by Sartomer Japan Inc.) and 30 g of polybutylene glycol dimethacrylate (ACRYESTER PBOM, manufactured by Mitsubishi Rayon Co., Ltd.) as the component (B2), added was 0.4 g of 1,1-bis(t-hexylperoxy)cyclohexane (PERHEXA HC, manufactured by NOF Corporation) as the radical polymerization initiator. After that, the resultant was mixed to obtain a raw material composition. The raw material composition was molded into a form suitable for the above-mentioned evaluation method by using the molding method A.

The physical properties of the obtained cured product were evaluated by the above method. Table 1 shows the results.

Example 2

A cured product was prepared in the same manner as in Example 1, except that the molding method C was employed instead of the molding method A in Example 1. The physical properties of the obtained cured product were evaluated by the above method. Table 1 shows the results.

Example 3

To 40 g of 1-adamantyl methacrylate (manufactured by Osaka Organic Chemical Industry Ltd.) as the component (A2), 20 g of dipentaerythritol pentaacrylate (SR-399, manufactured by Sartomer Japan Inc.) and 30 g of polybutylene glycol dimethacrylate (ACRYESTER PBOM, manufactured by Mitsubishi Rayon Co., Ltd.) as the component (B2), and 10 g of stearyl methacrylate (ACRYESTER S, manufactured by Mitsubishi Rayon Co., Ltd.) as the component (C2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 4

To 50 g of 1-adamantyl methacrylate (manufactured by Osaka Organic Chemical Industry Ltd.) as the component (A2), and 20 g of dipentaerythritol pentaacrylate (SR-399, manufactured by Sartomer Japan Inc.) and 30 g of polybutylene glycol dimethacrylate (ACRYESTER PBOM, manufactured by Mitsubishi Rayon Co., Ltd.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 5

To 50 g of 1-adamantyl methacrylate (manufactured by Osaka Organic Chemical Industry Ltd.) as the component (A2), and 40 g of ethoxylated (6) trimethylolpropane triacrylate (SR-499, manufactured by Sartomer Japan Inc.) and 10 g of dipentaerythritol pentaacrylate (SR-399, manufactured by Sartomer Japan Inc.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 6

To 50 g of 1-adamantyl methacrylate (manufactured by Osaka Organic Chemical Industry Ltd.) as the component (A2), and 10 g Of polybutylene glycol dimethacrylate (ACRYESTER PBOM, manufactured by Mitsubishi Rayon Co., Ltd.), 30 g of ethoxylated (6) trimethylolpropane triacrylate (SR-499, manufactured by Sartomer Japan Inc.), and 10 g of dipentaerythritol pentaacrylate (SR-399, manufactured by Sartomer Japan Inc.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 7

To 30 g of 1-adamantyl methacrylate (manufactured by Osaka Organic Chemical Industry Ltd.) as the component (A2), and 20 g of polybutylene glycol dimethacrylate (ACRYESTER PBOM, manufactured by Mitsubishi Rayon Co., Ltd.) and 50 g of dicyclopentanyl diacrylate (NK ESTER A-DCP, manufactured by Shin-Nakamura Chemical Co., Ltd.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 8

To 30 g of 1-adamantyl methacrylate (manufactured by Osaka Organic Chemical Industry Ltd.) as the component (A2), and 20 g of ethoxylated (6) trimethylolpropane triacrylate (SR-499, manufactured by Sartomer Japan Inc.) and 50 g of dicyclopentanyl diacrylate (NK ESTER A-DCP, manufactured by Shin-Nakamura Chemical Co., Ltd.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 9

To 90 g of 1-adamantyl methacrylate (manufactured by Osaka Organic Chemical Industry Ltd.) as the component (A2) and 10 g of polybutylene glycol dimethacrylate (ACRYESTER PBOM, manufactured by Mitsubishi Rayon Co., Ltd.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 10

To 50 g of 1-adamantyl methacrylate (manufactured by Osaka Organic Chemical Industry Ltd.) as the component (A2), and 30 g of ethoxylated (20) trimethylolpropane triacrylate (SR-415, manufactured by Sartomer Japan Inc.) and 20 g of dipentaerythritol pentaacrylate (SR-399, manufactured by Sartomer Japan Inc.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 11

To 50 g of 1-adamantyl methacrylate (manufactured by Osaka Organic Chemical Industry Ltd.) as the component (A2), and 30 g of ethoxylated (30) bisphenol A diacrylate (CD9038, manufactured by Sartomer Japan Inc.) and 20 g of dipentaerythritol pentaacrylate (SR-399, manufactured by Sartomer Japan Inc.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 12

To 70 g of 1-adamantyl methacrylate (manufactured by Osaka Organic Chemical Industry Ltd.) as the component (A2) and 30 g of hyperbranched polyester acrylate (CN2301, manufactured by Sartomer Japan Inc.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 13

To 50 g of 1-adamantyl methacrylate (manufactured by Osaka Organic Chemical Industry Ltd.) as the component (A2), and 20 g of ethoxy-modified hexafunctional acrylate (NTX 7323, manufactured by Sartomer Japan Inc.), 20 g of ethoxylated (6) trimethylolpropane triacrylate (SR-499, manufactured by Sartomer Japan Inc.), and 10 g of dipentaerythritol pentaacrylate (SR-399, manufactured by Sartomer Japan Inc.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Example 14

To 30 g of 1-adamantyl methacrylate (manufactured by Osaka Organic Chemical Industry Ltd.) as the component (A2), and 20 g of polyethylene glycol dimethacrylate (NK ESTER 9G, manufactured by Shin-Nakamura Chemical Co., Ltd.) and 50 g of dicyclopentanyl diacrylate (NK ESTER A-DCP, manufactured by Shin-Nakamura Chemical Co., Ltd.) as the component (B2), added were 0.4 g of lauroyl peroxide (PERROYL L, manufactured by NOF Corporation) as the radical polymerization initiator and 0.5 g of a phenol-based antioxidant (Irganox 1076, manufactured by Ciba Specialty Chemicals Inc.) as the antioxidant. After that, the resultant was mixed to obtain a raw material composition. The raw material composition was molded into a form suitable for the above-mentioned evaluation method by using the molding method B.

The physical properties of the obtained cured product were evaluated by the above method. Table 1 shows the results.

Comparative Example 1

To 100 g of a 1-adamantyl methacrylate monomer (manufactured by Osaka Organic Chemical Industry Ltd.), 0.4 g of 1,1-bis(t-hexylperoxy)cyclohexane (PERHEXA HC, manufactured by NOF Corporation) was added as the radical polymerization initiator. After that, the resultant was mixed to obtain a raw material composition. The raw material composition was molded into a form suitable for the above-mentioned evaluation method by using the molding method B.

The physical properties of the obtained cured product were evaluated by the above method. Table 2 shows the results.

Comparative Example 2

A cured product was prepared in the same manner as in Comparative Example 1, except that the monomer in Comparative Example 1 was changed to norbornyl methacrylate (manufactured by Wako Pure Chemical Industries, Ltd.).

The physical properties of the obtained cured product were evaluated by the above method. Table 2 shows the results.

Comparative Example 3

A cured product was prepared in the same manner as in Comparative Example 1, except that the monomer in Comparative Example 1 was changed to dicyclopentanyl methacrylate (FANCRYL FA-513M, manufactured by Hitachi Chemical Company, Ltd.).

The physical properties of the obtained cured product were evaluated by the above method. Table 2 shows the results.

Comparative Example 4

A cured product was prepared in the same manner as in Comparative Example 1, except that 0.5 g of a phenol-based antioxidant (Irganox 1076, manufactured by Ciba Specialty Chemicals Inc.) as the antioxidant was further added to the raw material composition in Comparative Example 1.

The physical properties of the obtained cured product were evaluated by the above method. Table 2 shows the results.

Comparative Example 5

A cured product was prepared in the same manner as in Comparative Example 2, except that 0.5 g of a phenol-based antioxidant (Irganox 1076, manufactured by Ciba Specialty Chemicals Inc.) as the antioxidant was further added to the raw material composition in Comparative Example 2.

The physical properties of the obtained cured product were evaluated by the above method. Table 2 shows the results.

Comparative Example 6

A cured product was prepared in the same manner as in Comparative Example 3, except that 0.5 g of a phenol-based antioxidant (Irganox 1076, manufactured by Ciba Specialty Chemicals Inc.) as the antioxidant was further added to the raw material composition in Comparative Example 3.

The physical properties of the obtained cured product were evaluated by the above method. Table 2 shows the results.

TABLE 1

| | | Unit | Example 1 | Example 2 | Example 3 | Example 4 | Example 5 |
|---|---|---|---|---|---|---|---|
| Component (A2) | | | 1-adamantyl methacrylate | 1-adamantyl methacrylate | 1-adamantyl methacrylate | 1-adamantyl methacrylate | 1-adamantyl methacrylate |
| Loadings of component (A2) | | Parts by mass | 50 | 50 | 40 | 50 | 50 |
| Component (B2) | | | PBOM/SR399 | PBOM/SR399 | PBOM/SR399 | PBOM/SR399 | SR499/SR399 |
| Loadings of component (B2) | | Parts by mass | 30/20 | 30/20 | 30/20 | 30/20 | 40/10 |
| Content of compound unit containing soft segment moiety | | Mass % | 60 | 60 | 60 | 60 | 80 |
| Component (C2) | | | — | — | ACRYESTER S | — | — |
| Loadings of component (C2) | | Parts by mass | — | — | 10 | — | — |
| Antioxidant | | | — | — | Irganox 1076 | Irganox 1076 | Irganox 1076 |
| Additive amount of antioxidant | | Parts by mass | — | — | 0.5 | 0.5 | 0.5 |
| Radical polymerization initiator | | | PERHEXA HC | PERHEXA HC | PERROYL L | PERROYL L | PERROYL L |
| Molding method | | | A | C | B | B | B |
| | Total curing time | Minute | 240 | 3 | 240 | 240 | 240 |
| Initial properties | Total light transmittance | % | 92 | 92 | 92 | 92 | 92 |
| | YI value | | 1.6 | 1.6 | 1.6 | 1.6 | 1.7 |
| Heat resistance test 1 | Crack | | ○ | ○ | ○ | ○ | ○ |
| | Shape stability | | ○ | ○ | ○ | ○ | ○ |
| | Δ250 Total light transmittance | % | 0 | 0 | 0 | 0 | 0 |
| | Δ250 YI | | 0.5 | 0.5 | 1.1 | 0.3 | 0.4 |
| Heat resistance test 2 | Δ140 Total light transmittance | % | 0 | 0 | 0 | 0 | 0 |
| | Δ140 YI | | 0.7 | 0.8 | 0.7 | 0.5 | 0.6 |

| | | Unit | Example 6 | Example 7 | Example 8 | Example 9 | Example 10 |
|---|---|---|---|---|---|---|---|
| Component (A2) | | | 1-adamantyl methacrylate | 1-adamantyl methacrylate | 1-adamantyl methacrylate | 1-adamantyl methacrylate | 1-adamantyl methacrylate |
| Loadings of component (A2) | | Parts by mass | 50 | 30 | 30 | 90 | 50 |
| Component (B2) | | | PBOM/SR499/SR399 | PBOM/A-DCP | SR499/A-DCP | PBOM | SR415/SR399 |
| Loadings of component (B2) | | Parts by mass | 10/30/10 | 20/50 | 20/50 | 10 | 30/20 |
| Content of compound unit containing soft segment moiety | | Mass % | 80 | 29 | 29 | 100 | 60 |
| Component (C2) | | | — | — | — | — | — |
| Loadings of component (C2) | | Parts by mass | — | — | — | — | — |
| Antioxidant | | | Irganox 1076 | Irganox 1076 | Irganox 1076 | Irganox 1076 | Irganox 1076 |
| Additive amount of antioxidant | | Parts by mass | 0.5 | 0.5 | 0.5 | 0.5 | 0.5 |
| Radical polymerization initiator | | | PERROYL L | PERROYL L | PERROYL L | PERROYL L | PERROYL L |
| Molding method | | | B | B | B | B | B |
| | Total curing time | Minute | 240 | 240 | 240 | 240 | 240 |
| Initial properties | Total light transmittance | % | 91 | 92 | 92 | 92 | 92 |
| | YI value | | 2.1 | 1.7 | 1.2 | 2.1 | 1.4 |
| Heat resistance test 1 | Crack | | ○ | ○ | ○ | ○ | ○ |
| | Shape stability | | ○ | ○ | ○ | Δ | ○ |
| | Δ250 Total light transmittance | % | 0 | 0 | 0 | 0 | 0 |
| | Δ250 YI | | 1.0 | 2.1 | 2.3 | 0.5 | 0.3 |

TABLE 1-continued

| | | | | | | | |
|---|---|---|---|---|---|---|---|
| Heat resistance test 2 | Δ140 Total light transmittance | % | 0 | 0 | 0 | 0 | 0 |
| | Δ140 YI | | 0 | 2.1 | 2.3 | 0.9 | 1.3 |

| | Unit | Example 11 | Example 12 | Example 13 | Example 14 |
|---|---|---|---|---|---|
| Component (A2) | | 1-adamantyl methacrylate | 1-adamantyl methacrylate | 1-adamantyl methacrylate | 1-adamantyl methacrylate |
| Loadings of component (A2) | Parts by mass | 50 | 70 | 50 | 30 |
| Component (B2) | | CD9038/SR399 | CN2301 | NTX7323/SR499/SR399 | 9G/A-DCP |
| Loadings of component (B2) | Parts by mass | 30/20 | 30 | 20/20/10 | 20/50 |
| Content of compound unit containing soft segment moiety | Mass % | 60 | 100 | 80 | 29 |
| Component (C2) | | — | — | — | — |
| Loadings of component (C2) | Parts by mass | — | — | — | — |
| Antioxidant | | Irganox 1076 | Irganox 1076 | Irganox 1076 | Irganox 1076 |
| Additive amount of antioxidant | Parts by mass | 0.5 | 0.5 | 0.5 | 0.5 |
| Radical polymerization initiator | | PERROYL L | PERROYL L | PERROYL L | PERROYL L |
| Molding method | | B | B | B | B |
| | Total curing time | Minute | 240 | 240 | 240 | 240 |
| Initial properties | Total light transmittance | % | 91 | 90 | 92 | 92 |
| | YI value | | 3.4 | 3.6 | 2.9 | 1.9 |
| Heat resistance test 1 | Crack | | ○ | ○ | ○ | ○ |
| | Shape stability | | ○ | ○ | ○ | ○ |
| | Δ250 Total light transmittance | % | 0 | 0 | 0 | 0 |
| | Δ250 YI | | 1.1 | 1.2 | 0.8 | 0.9 |
| Heat resistance test 2 | Δ140 Total light transmittance | % | 0 | 0 | 0 | 0 |
| | Δ140 YI | | 0.4 | 2.1 | 4.0 | 2.3 |

TABLE 2

| | Unit | Comparative Example 1 | Comparative Example 2 | Comparative Example 3 |
|---|---|---|---|---|
| Component (A2) | | 1-adamantyl methacrylate | norbornyl methacrylate | dicyclopentanyl methacrylate |
| Loadings of component (A2) | Parts by mass | 100 | 100 | 100 |
| Component (B2) | | — | — | — |
| Loadings of component (B2) | Parts by mass | — | — | — |
| Content of compound unit containing soft segment moiety | Mass % | — | — | — |
| Component (C2) | | — | — | — |
| Loadings of component (C2) | Parts by mass | — | — | — |
| Antioxidant | | — | — | — |
| Additive amount of antioxidant | Parts by mass | — | — | — |
| Radical polymerization initiator | | PERHEXA HC | PERHEXA HC | PERHEXA HC |
| Molding method | | B | B | B |
| | Total curing time | Minute | 240 | 240 | 240 |
| Initial properties | Total light transmittance | % | 90 | 89 | 90 |
| | YI value | | 2.6 | 2.8 | 2.4 |
| Heat resistance test 1 | Crack | | x | x | x |
| | Shape stability | | x | x | x |
| | Δ250 Total light transmittance | % | ND | ND | ND |
| | Δ250 YI | | ND | ND | ND |
| Heat resistance test 2 | Δ140 Total light transmittance | % | 0 | 3 | 2 |
| | Δ140 YI | | 2.2 | 2.8 | 2.2 |

| | Unit | Comparative Example 4 | Comparative Example 5 | Comparative Example 6 |
|---|---|---|---|---|
| Component (A2) | | 1-adamantyl methacrylate | norbornyl methacrylate | dicyclopentanyl methacrylate |
| Loadings of component (A2) | Parts by mass | 100 | 100 | 100 |
| Component (B2) | | — | — | — |
| Loadings of component (B2) | Parts by mass | — | — | — |
| Content of compound unit containing soft segment moiety | Mass % | — | — | — |
| Component (C2) | | — | — | — |
| Loadings of component (C2) | Parts by mass | — | — | — |
| Antioxidant | | Irganox 1076 | Irganox 1076 | Irganox 1076 |
| Additive amount of antioxidant | Parts by mass | 0.5 | 0.5 | 0.5 |
| Radical polymerization initiator | | PERHEXA HC | PERHEXA HC | PERHEXA HC |
| Molding method | | B | B | B |
| | Total curing time | Minute | 240 | 240 | 240 |

TABLE 2-continued

| | | | | | |
|---|---|---|---|---|---|
| Initial properties | Total light transmittance | % | 90 | 89 | 90 |
| | YI value | | 2.9 | 2.2 | 2.6 |
| Heat resistance test 1 | Crack | | x | x | x |
| | Shape stability | | x | x | x |
| | Δ250 Total light transmittance | % | ND | ND | ND |
| | Δ250 YI | | ND | ND | ND |
| Heat resistance test 2 | Δ140 Total light transmittance | % | 0 | 2 | 1 |
| | Δ140 YI | | 1.3 | 1.8 | 1.5 |

INDUSTRIAL APPLICABILITY

The resin for an optical component of the present invention is a material having high transparency enough to be applied in: a light guide plate and a prism; a diffraction lens; a liquid crystal panel; an optical lens; a projector lens; a headlamp lens; a camera lens; a digital camera lens; a digital video lens; an optical lens and other optical communication lenses used for an optical pickup device such as a CD, a CD-ROM, a CD-R, a CD-RW, a video CD, an MO, a DVD, a Blu-ray Disc, and an HD DVD; an on-board lens; a surveillance lens; a projector lens; an lens used for a variety of equipment including office automation equipment such as a copier and a printer; a medical lens; and an imaging device lens suitable for various applications such as a cell-phone and a PDA equipped with a subminiature digital camera or an imaging device. In addition, the resin for an optical component of the present invention is a material having high heat resistance during use or assembling.

The invention claimed is:

1. A resin for an optical component, comprising:
   a (meth)acrylate compound unit (A1) in which a hydrocarbon group containing an adamantane structure is ester-bonded; and
   a (meth)acrylate compound unit (B1) having a polyfunctional group, which is other than the unit (A 1), wherein the (meth)acrylate compound unit (B1) comprises a (meth)acrylate compound unit having a bifunctional group and a (meth)acrylate compound unit having a trifunctional group or more.

2. The resin for an optical component according to claim 1, comprising 1 to 80 mass % of the (meth)acrylate compound unit (B1).

3. The resin for an optical component according to claim 1, wherein at least one kind of the (meth)acrylate compound unit (B1) contains a soft segment moiety.

4. The resin for an optical component according to claim 3, wherein the content of the (meth)acrylate compound unit containing a soft segment moiety in the unit (B1) is 20 to 100 mass %.

5. The resin for an optical component according to claim 1, further comprising one kind or more of (meth)acrylate compound unit (C1) which is other than the unit (B1), and is selected from a (meth)acrylate-modified silicone unit, a long-chain alkyl(meth)acrylate unit, and a polyalkylene glycol (meth)acrylate unit.

6. The resin for an optical component according to claim 1, comprising 0.01 to 10 parts by mass of an antioxidant with respect to 100 parts by mass of the resin.

7. A raw material composition used for a resin for an optical component, comprising:
   a (meth)acrylate compound (A2) in which a hydrocarbon group containing an adamantane structure is ester-bonded; and
   a (meth)acrylate compound (B2) having a polyfunctional group, which is other than the compound (A2),
   wherein the (meth)acrylate compound unit (B2) comprises a (meth)acrylate compound unit having a bifunctional group and a (meth)acrylate compound unit having a trifunctional group or more.

8. The raw material composition according to claim 7, comprising 1 to 80 mass % of the (meth)acrylate compound (B2).

9. The raw material composition according to claim 7, wherein at least one kind of the (meth)acrylate compound (B2) contains a soft segment moiety.

10. The raw material composition according to claim 9, wherein the content of the (meth)acrylate compound containing a soft segment moiety in the component (B2) is 20 to 100 mass %.

11. The raw material composition according to claim 7, further comprising one kind or more of (meth)acrylate compound (C2) which is other than the compound (B2), and is selected from (meth)acrylate-modified silicone oil, long-chain alkyl(meth)acrylate, and polyalkylene glycol (meth) acrylate.

12. The raw material composition according to claim 7, comprising 0.01 to 10 parts by mass of an antioxidant with respect to 100 parts by mass of the raw material composition.

13. An optical component comprising the raw material composition according to claim 7, the optical component being obtained by polymerizing and molding the raw material composition.

14. An optical component comprising the raw material composition according to claim 7, the optical component being obtained by polymerizing and molding the raw material composition using a liquid resin molding method.

* * * * *